(12) United States Patent
Kalinichenko et al.

(10) Patent No.: US 9,843,578 B2
(45) Date of Patent: Dec. 12, 2017

(54) MOBILE SECURITY FOB

(71) Applicants: Boris Kalinichenko, Jamaica Plain, MA (US); Joseph G. Ferra, Dover, MA (US)

(72) Inventors: Boris Kalinichenko, Jamaica Plain, MA (US); Joseph G. Ferra, Dover, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/835,810

(22) Filed: Aug. 26, 2015

(65) Prior Publication Data

US 2015/0365405 A1    Dec. 17, 2015

Related U.S. Application Data

(63) Continuation of application No. 13/771,193, filed on Feb. 20, 2013, now Pat. No. 9,124,582.

(51) Int. Cl.
*H04L 29/06* (2006.01)
*G06F 21/43* (2013.01)
*H04W 12/06* (2009.01)

(52) U.S. Cl.
CPC .......... *H04L 63/0853* (2013.01); *G06F 21/43* (2013.01); *H04L 63/08* (2013.01); *H04L 63/0876* (2013.01); *H04L 63/18* (2013.01); *H04W 12/06* (2013.01); *H04L 2463/082* (2013.01)

(58) Field of Classification Search
None
See application file for complete search history.

(56) References Cited

U.S. PATENT DOCUMENTS

| | | | |
|---|---|---|---|
| 6,708,200 B1 | 3/2004 | Ura et al. | |
| 7,536,722 B1 | 5/2009 | Saltz et al. | |
| 7,812,854 B1 | 10/2010 | Delker et al. | |
| 8,286,227 B1 * | 10/2012 | Zheng | H04L 63/0853 726/2 |
| 8,381,265 B2 * | 2/2013 | Muraki | G06Q 10/10 713/168 |
| 8,689,297 B2 | 4/2014 | Pasquero et al. | |
| 8,806,589 B2 | 8/2014 | Subramanya et al. | |
| 2002/0177433 A1 | 11/2002 | Bravo et al. | |
| 2005/0033703 A1 | 2/2005 | Holdsworth | |

(Continued)

FOREIGN PATENT DOCUMENTS

| | | |
|---|---|---|
| WO | WO2002/19593 | 3/2002 |
| WO | WO2007/143795 | 12/2007 |
| WO | WO2010/064128 | 6/2010 |

OTHER PUBLICATIONS

European Search Report in corresponding Application No. 14155777.7, dated Jun. 6, 2014, pp. 1-6.

(Continued)

*Primary Examiner* — Benjamin Lanier
(74) *Attorney, Agent, or Firm* — Proskauer Rose LLP

(57) ABSTRACT

A computer-implemented method comprising: receiving, from a primary factor authentication device by one or more computer systems, a request to enroll a mobile device as a secondary factor authentication device; and
  enrolling by the one or more computer systems the mobile device as a first, secondary factor authentication device.

20 Claims, 5 Drawing Sheets

(56) References Cited

U.S. PATENT DOCUMENTS

| | | | | |
|---|---|---|---|---|
| 2006/0274869 | A1* | 12/2006 | Morse | G06F 17/30905 |
| | | | | 375/352 |
| 2008/0022377 | A1 | 1/2008 | Chen et al. | |
| 2010/0293598 | A1* | 11/2010 | Collart | G06F 17/30056 |
| | | | | 726/3 |
| 2011/0099277 | A1 | 4/2011 | Yao et al. | |
| 2011/0138483 | A1 | 6/2011 | Bravo et al. | |
| 2011/0211699 | A1* | 9/2011 | Ma | H04L 9/0819 |
| | | | | 380/278 |
| 2011/0270751 | A1 | 11/2011 | Csinger et al. | |
| 2011/0276478 | A1 | 11/2011 | Hirson et al. | |
| 2012/0222099 | A1 | 8/2012 | Narendra et al. | |
| 2013/0117834 | A1* | 5/2013 | Ishioka | H04L 63/0869 |
| | | | | 726/7 |
| 2013/0134212 | A1* | 5/2013 | Chang | G06F 11/0742 |
| | | | | 235/375 |
| 2013/0262309 | A1* | 10/2013 | Gadotti | G06Q 20/3276 |
| | | | | 705/44 |
| 2013/0262687 | A1* | 10/2013 | Avery | G06F 9/54 |
| | | | | 709/229 |
| 2013/0269026 | A1* | 10/2013 | Deluca | H04L 63/0853 |
| | | | | 726/19 |
| 2013/0340044 | A1* | 12/2013 | Litvin | G06F 21/41 |
| | | | | 726/4 |
| 2014/0096220 | A1* | 4/2014 | Da Cruz Pinto | G06F 21/00 |
| | | | | 726/9 |
| 2014/0197232 | A1* | 7/2014 | Birkler | G06F 21/313 |
| | | | | 235/375 |
| 2014/0208384 | A1 | 7/2014 | Youssefian et al. | |
| 2014/0214564 | A1* | 7/2014 | Argue | G06Q 30/0633 |
| | | | | 705/16 |
| 2015/0215770 | A1* | 7/2015 | Chan | H04W 12/04 |
| | | | | 455/456.1 |

OTHER PUBLICATIONS

European Search Report in corresponding Application No. 14155777.7, dated Oct. 10, 2014, pp. 1-6.
MobileKey (Mobile Authentication Server) 2 Factor Authentication, Apr. 29, 2009, pp. 1-3.

* cited by examiner

MOBILE SECURITY FOB

BACKGROUND

This invention generally relates to computer-based authentication.

A system such as a computer-based system authenticates a user of the system by prompting the user to provide answers to security questions. To increase security in accessing the system, the system prompts the user to answer more security questions or to answer security questions with more complex answers.

SUMMARY

In general, in one aspect, a computer-implemented comprises: receiving, from a primary factor authentication device by one or more computer systems, a request to enroll a mobile device as a secondary factor authentication device; and enrolling by the one or more computer systems the mobile device as a first, secondary factor authentication device.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. Implementations may include one or more of the following features. In some implementations, the method includes generating, by the one or more computer systems, a key code for enrolling the mobile device as the first, secondary factor authentication device; and transmitting the key code to the primary factor authentication device. In other implementations, the primary factor authentication device is configured to re-transmit the key code to the mobile device. In still other implementations, the method includes receiving a message specifying validation of the key code from an authentication system that received the key code from the mobile device. In some implementations, enrolling further comprises: receiving, by the one or more computer systems from an authentication system, the device identifier of the mobile device; and adding the device identifier to the profile of a user associated with the primary factor authentication device that sent the request. In still other implementations, the method includes generating a pairing instruction to cause a connection between the primary factor authentication device and the mobile device; and transmitting the pairing instruction to the primary factor authentication device.

In general, in another aspect, a computer-implemented comprises: receiving, from a client device by one or more computer systems, a request to perform an action, with the request comprising information identifying a user associated with the client device; retrieving a user profile of the user of the client device, with the user profile including a device identifier of a mobile device associated with the user; generating, by the one or more computer systems, an authentication token for confirming that the user is authorized to perform the action; receiving, from an authentication system, a decrypted version of an authentication token and a device identifier of a mobile device that is in proximity to the client device; determining a match between the generated authentication token and the decrypted authentication token; determining a match between the received device identifier and the device identifier included in the user profile; and performing, by the one or more computer systems, the requested action when there are matches between tokens and device identifiers.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. Implementations may include one or more of the following features. In some implementations, the method includes based on the matches, confirming that the user is authorized to request performance of the action. In still other implementations, the client device is a primary factor authentication device, the mobile device is a secondary factor authentication device and wherein the actions of determining the matches comprise: performing automatic secondary factor authentication independent of entry by the user of secondary factor authentication information, with the secondary factor authentication being based on the decrypted version of the authentication token. In still other implementations, the one or more computer systems include the authentication system and a business processing application, and the method further comprises: receiving, from the mobile device that is in proximity to the client device, an encrypted version of the generated authentication token and the device identifier of the mobile device that is in proximity to the client device; retrieving, based on the device identifier of the mobile device that is in proximity to the client device, a key associated with the device identifier of the mobile device that is in proximity to the client device; decrypting the encrypted version of the authentication token with the key; and transmitting, to the business processing application, the decrypted version of the authentication token and the device identifier of the mobile device that is in proximity to the client device.

DETAILED DESCRIPTION

Figure 1:
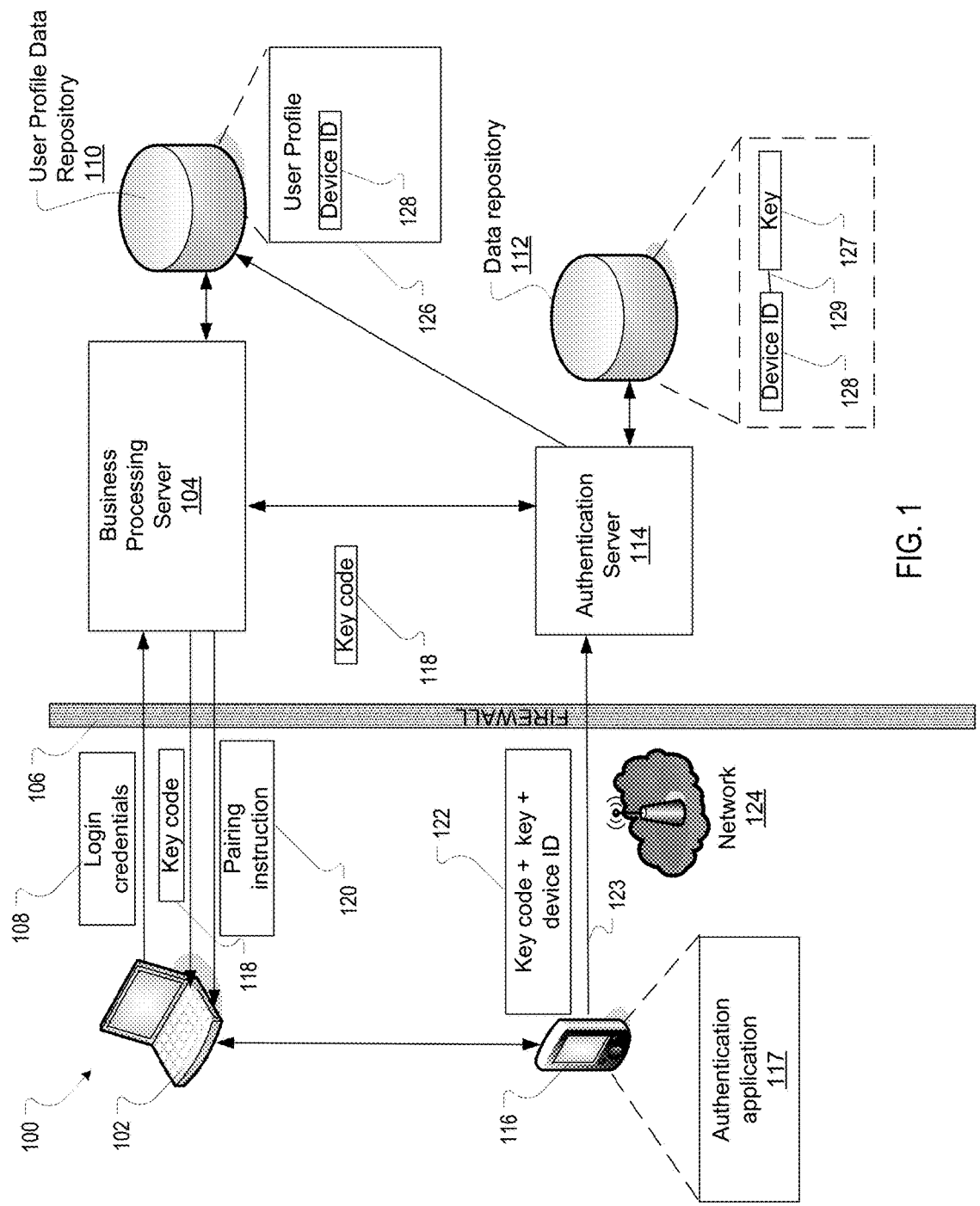
FIGS. 1 and 2 are diagrammatic views of a multifactor authentication system.

Referring now to FIG. 1, an example system 100 implementing an automated multifactor authentication service is shown. In general, multifactor authentication includes a process for authenticating a user of a system through the use of multiple factors (e.g., questions, properties of a user's geographic surrounding, properties of a user's mobile device, and so forth). One type of multifactor authentication uses primary factor authentication and secondary factor authentication. Primary factor authentication is authentication based on primary factor authentication information, which is a first type of information that is used in verifying an identity of a user. Secondary factor authentication is authentication based on secondary factor authentication information, which is a second type of information that is used in verifying an identity of a user. Common examples of secondary factor authentication include use of an automatically updatable Fob for which a user manually enters a code read from the Fob in order to access remote resources hosted by the system with a user device.

A different example of secondary factor authentication include is shown in system 100. In System 100 a secondary factor authentication process is executed to automatically allow access to a, e.g., server 104 for devices that were previously authenticated to the server 104. More particularly, the system 100 includes a client device 102, a mobile device 116, a business processing server 104, data repositories 110, 112, an authentication server 114, and a firewall 106 coupled via a network 124. Examples of network 124 include a local area network ("LAN") and a wide area network ("WAN"), e.g., the Internet. One or more of client device 102 and mobile device 116 communicate with one or more of business processing server 104 and authentication server 114 over network 124 and run programs having client-server relationships to each other. A user (not shown) of client device 102 also uses mobile device 116. Mobile device 116 and client device 102 are in proximity to each other and are also in a communication range of each other.

Business processing server 104 hosts various resources. A resource includes an item of data that is accessible from a network. There are various types of resources, including, e.g., HTML pages, web pages, web sites word processing documents, portable document format (PDF) documents, images, videos, applications, and so forth. Business processing server 104 also implements a multifactor authentication process to verify that a particular user is authorized to access a particular resource hosted on the business processing server 104. Authentication server 114 generates information that is transmitted to business processing server 104 for use in the multifactor authentication.

Business processing server 104 accesses data repository 110, e.g., a data repository for storing user profiles. Data repository 110 stores various user profiles, including, e.g., user profile 126, which is a user profile of a user that is associated with client device 102. The user (of client device 102) logs into a resource hosted by business processing server 104, e.g., by transmitting login credentials 108 to business processing server 104. Login credentials 108 include information indicative of a user name and a password associated with an account of the user.

Along with login credentials 108, client device 102 also sends, to business processing server 104, a request (not shown) to add mobile device 116 to user profile 126 as an authenticated device (e.g., as a secondary factor authentication device). A secondary factor authentication device is an authenticated device that generates secondary factor authentication information. An authenticated device is a device that business processing server 104 has confirmed as being associated with a particular user, e.g., the user associated with client device 102.

In response to the request, business processing server 104 generates a key code 118, which is a unique alphanumeric string that is used in authenticating mobile device as a secondary factor authentication device. Using login credentials 108, business processing server 104 identifies that user profile 126 is associated with login credentials 108. Based on this association, business processing server 104 updates user profile 126 with the key code 118, and/or with information indicative of the key code 118.

Business processing server 104 transmits the key code 118 to authentication server 114 to enable authentication server 114 to maintain a list of valid key codes, e.g., key codes that are generated by business processing server 104. Business processing server 104 also transmits the key code 118 to client device 102. Client device 102 displays a visual representation of the key code 118 on a monitor of client device 102, e.g., to enable a user of client device 102 to view the key code 118.

Mobile device 116 implements authentication application 117, which is an application for enabling mobile device 116 provide business processing server 104 with secondary factor authentication information. A user of mobile device 116 downloads authentication application 117 from business processing server 104 and/or from authentication server 114. A user launches authentication application 117 and enters the key code 118 into a graphical user interface (not shown) produced by authentication application 117 and displayed on a display of mobile device 116.

In response to entry of key code 118, authentication application 117 generates authentication information 112, which includes key code 118, encryption key 127 (hereinafter key 127), and device identifier (ID) 128 of mobile device 116. Authentication application 117 generates, e.g., a random number (i.e., key 127), e.g., using various techniques for generation of an encryption key. Device ID 128 includes an alphanumeric string that is unique for mobile device 116. Mobile device 116 transmits (123) authentication information 122 to authentication server 114, e.g., over network 124 and through firewall 106.

Using authentication information 122, authentication server 114 causes business processing server 104 to authenticate mobile device 116 as a secondary factor authentication device. In particular, authentication server 114 validates that key code 118 is a valid key code that is generated by business processing server 104. Authentication server 114 validates key code 118 by comparing key code to other key codes that have been received from business processing server 104. Authentication server 114 identifies a match between key code 118 and one of the key codes received from business processing server 104. Based on the match, authentication server 114 verifies that key code 118 is a valid key code. Based on validation of key code 118, authentication server 114 determines that mobile device 116 is authorized to communicate with a client device (e.g., client device 102) that transmitted key code 118 to mobile device 116.

Following validation of key code 118, authentication server 114 stores device ID 128 for mobile device 116 and key 127 in data repository 112. Authentication server 114 generates an association 129 among device ID 128 and key 127 stored in data repository 112. An association includes a pointer between items of data. Authentication server 114 transmits, to business processing server 104, device ID 128, along with an instruction to add device ID 128 to a user profile (e.g., user profile 126) that is associated with key code 118. Following generation of key code 118, business processing server 104 adds to user profile 126 information (not shown) specifying that key code 118 is associated with user profile 126. Business processing server 104 adds device ID 128 to user profile 126, based on user profile 126 including a key code that matches key code 118. Following updating of user profile 126 with device ID 128, mobile device 116 is authenticated to business processing server 104, e.g., which promotes use of mobile device 116 in performing enrolled multifactor authentication.

As described in further detail below, client device 102 and mobile device 116 are used to perform enrolled multifactor authentication. Client device 102 is a primary factor authentication device. Mobile device 116 is a secondary factor authentication device. Enrolled multifactor authentication includes a multifactor authentication process that is independent of a secondary factor authentication device generating secondary factor authentication information that a user enters into business processing server 104. In enrolled multifactor authentication, a mobile device is enrolled ahead of time with a system as a secondary factor authentication device, e.g., to promote automatic secondary factor authentication. A primary factor authentication device is an authenticated device that generates primary factor authentication information. In enrolled multifactor authentication, the secondary factor authentication device automatically submits the secondary factor authentication information to business processing server 104, e.g., without manual entry of the secondary factor authentication information into business processing server 104 by a user.

Using device ID 128, business processing server 104 generates pairing instruction set 120 for client device 102. A pairing instruction set includes a series of instructions for implementing a pairing process. A pairing process is a processing in which a particular device recognizes other devices, e.g., to control which devices are allowed to connect to the particular device and to automatically establish a connection (without user intervention) to these other devices.

Receipt of device ID 128 triggers generation of pairing instruction 120 by business processing server 104. Pairing instruction 120 includes device ID 128 for mobile device 116 and a device ID for client device 102. User profile 126 includes a device ID for client device 102. Business processing server 104 updates user profile 126 with the device ID for client device 102, e.g., following receipt of the request to add information indicative of an authenticated device to user profile 126. Business processing server 104 transmits pairing instruction 120 to client device 102. Pairing instruction 120 includes information instructing client device 102 to execute a pairing process with mobile device 116 associated with device ID 128. Using pairing instruction 120, client device 102 performs pairing (e.g., executes a pairing process) between client device 102 and mobile device 116.

Figure 2:
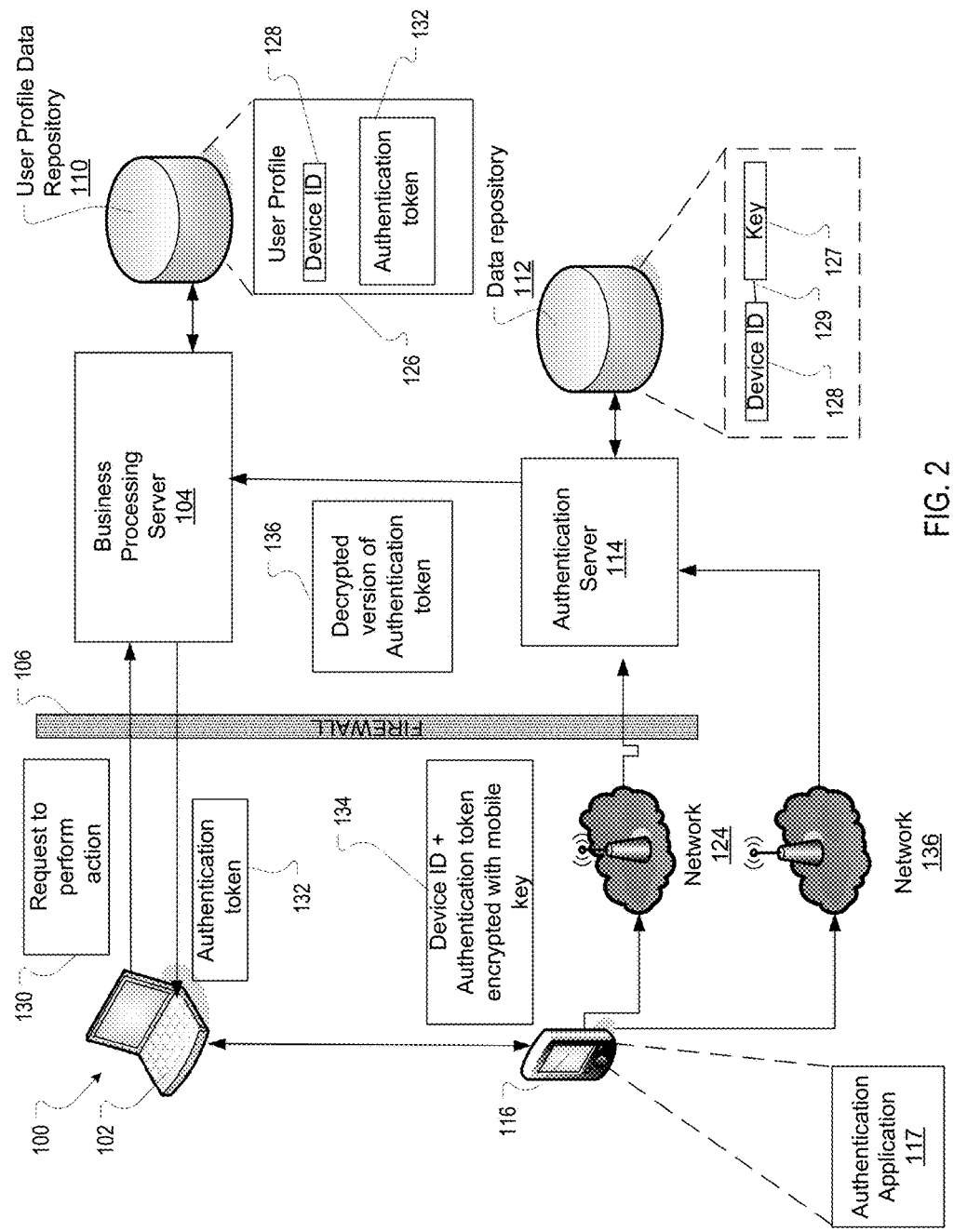

Referring to FIG. 2, business processing server 104 implements the enrolled multifactor authentication process, which provides a decreased amount of disturbance to a user relative to an amount of disturbance common with other multifactor authentication processes that require a user to manually input secondary factor authentication information. Client device 102 is a primary factor authentication device. Client device 102 generates request 130 to perform an action, e.g., to access a resource hosted by business processing server 104. For example, request 130 includes a request to access financial account information of a user of client device 102. Request 130 includes primary factor authentication information, e.g., a user name and a password for accessing the financial account information.

In response to receipt of the request 130, business processing server 104 generates authentication token 132. The authentication token 132 is a series of data bits used in performing secondary factor authentication. Business processing server 104 transmits authentication token 132 to client device 102.

In response to receiving authentication token 132, client device 102 executes a pairing process with mobile device 116, e.g., to automatically establish a connection with mobile device 116. Following establishment of the connection between client device 102 and mobile device 116, client device 116 transmits authentication token 132 to mobile device 116. Authentication application 117 receives authentication token 132. In response, authentication application 117 uses key 127 to encrypt authentication token 132. As previously described, mobile device 116 is configured to generate and to store key 127. Authentication application 117 also generates information 134, which includes the encrypted version of authentication token 132 and device ID 128 for mobile device 116.

Mobile device 116 transmits information 134 to authentication server 114, e.g., via network 124 and through firewall 106. System 100 also includes network 136, which is a private network of authentication server 114 that bypasses firewall. Examples of network 136 include a LAN and a WAN. Based on mobile device 116 being authenticated by authentication server 114, authentication server 114 enables mobile device 116 to access network 136 in transmitting information to authentication server 114. Mobile device 116 can also send information to authentication server 114 via network 136.

Authentication server 114 receives information 134. Authentication server 114 detects device ID 128 in information 134. Using device ID 128, authentication server 114 identifies, in data repository 112, association 129 among device ID 128 and key 127. Based on association 129, authentication server 114 determines that key 127 is used in decrypting information associated with device ID 128. Authentication server 114 parses information 134 for the encrypted version of authentication token 132. Authentication server 114 uses key 127 to decrypt the encrypted version of authentication token 132. Decryption of the encrypted version of authentication token 132 produces decrypted version 136 of authentication token 132.

Decrypted version 136 of authentication token 132 is secondary factor authentication information that is used by business processing server 104 to perform secondary factor authentication with regard to request 130. Decrypted version 136 of authentication token 132 is also secondary factor authentication information with a decreased amount of disruption to a user, relative to an amount of disruption to the user of other types of secondary factor authentication information. Decrypted version 136 of authentication token 132 has a decreased amount of disruption to the user, based on decrypted version 136 of authentication token 132 being automatically generated by authentication server 114 and being automatically sent to business processing server 104, e.g., without input from the user of client device 102 and mobile device 116. In particular, client device 102 initiates the process of generating the secondary factor authentication information (e.g., decrypted version 136 of authentication token 132) by sending (e.g., automatically and independent of a user request) authentication token 132 to mobile device 116. Mobile device 116 continues the process of generating (e.g., automatically) the secondary factor authentication information by sending (e.g., automatically and independent of a user request) information 132 to authentication server 114, which in turn causes authentication server 114 to generate decrypted version 136 of authentication token 132.

Authentication server 114 transmits to business processing server 104 decrypted version 136 of authentication token 132 to business processing server 104, along with device ID 128 of mobile device 116. In response, business processing server 104 scans user profiles in data repository 110 for an authentication token that matches decrypted version 136 of authentication token 132. Business processing server 104 identifies that authentication token 132 in user profile 126 matches decrypted version 136 of authentication token 132. Business processing server 104 scans user profiles in data repository 110 for a device ID that matches device ID 128 transmitted from authentication server 114. Business processing server 104 identifies that device ID 128 in user profile 126 matches device ID 128 transmitted from authentication server 114. Through matching of the device IDs and the authentication tokens, business processing server 104 performs secondary factor authentication for request 130. Business processing server 104 performs the secondary factor authentication by confirming the presence of mobile device 116 (which is a secondary factor authentication device) in proximity to client device 102. Mobile device 116 is a mobile security fob. Through matching of the device IDs and the authentication tokens, business processing server 104 confirms the presence of mobile device 116 (which is a secondary factor authentication device) in proximity to client device 102.

Figure 3:
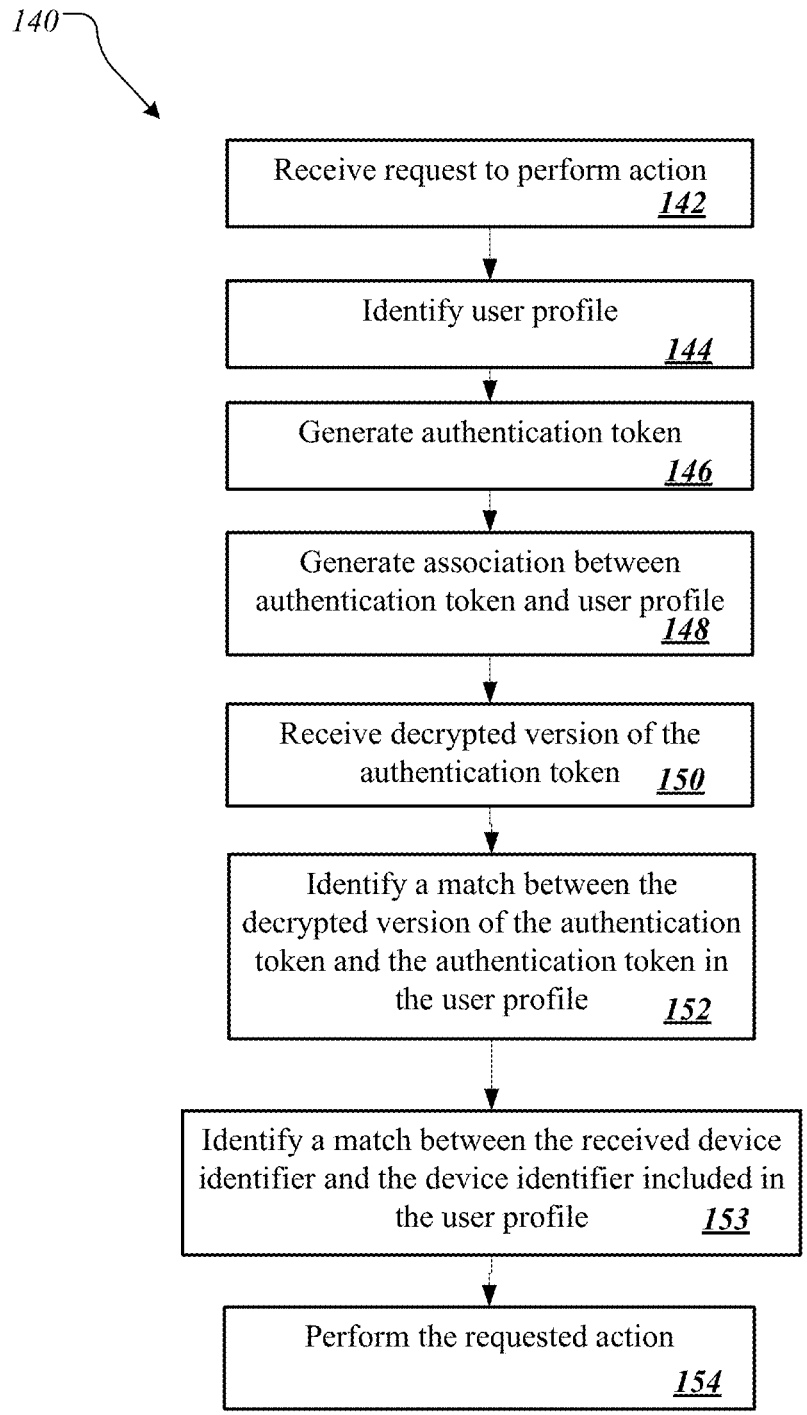
FIGS. 3 and 4 are flow charts useful in understanding the multifactor authentication system.

In a variation of FIG. 3, business processing server 104 and authentication server 114 are integrated into a server. The server includes a business processing application, e.g., for performing the actions of business processing server 104 described herein.

Referring to FIG. 3, business processing server 104 implements process 140 in performing multifactor authentication. Process 140 implements multifactor authentication with a decreased amount of disruption to the user, relative to an amount of disruptions to the user of other types of multifactor authentication in which a user inputs secondary factor authentication information into business processing server 104.

In operation, business processing server 104 receives (142), from a client device, a request to perform an action, e.g., request 130 (FIG. 2). The received request includes information identifying a user associated with the client device (e.g., login credentials of the user, a user name of the user, and so forth). Business processing server 104 identifies (144), based on the information identifying the user of the client device, a user profile of the user. The user profile includes information identifying a user associated with the user profile. Business processing server 104 identifies a match between the received information identifying the user of the client device and the information identifying the user associated with the user profile. The user profile also includes a device identifier of a mobile device that is associated with the user of the client device.

Using the device identifier of the mobile device 116, business processing server 104 generates (146) an authentication token for confirming that the user is authorized to perform the action. The authentication token includes the device identifier of the mobile device, e.g., to promote using a presence of the mobile device specified by the device identifier as secondary factor authentication information. Business processing server 104 also generates (148), in a data repository, an association among the authentication token and the user profile. Business processing server 104 receives (150), from an authentication server, a decrypted version of an authentication token and a device identifier of a mobile device that is in proximity to the client device. Business processing server 104 identifies (152) a match between the authentication token that is generated for the user and the decrypted version of the authentication token. Business processing server 104 also identifies (153) a match between the received device identifier and the device identifier included in the user profile. In response to the identified matches, business processing server 104 performs (154) the requested action.

Figure 4:
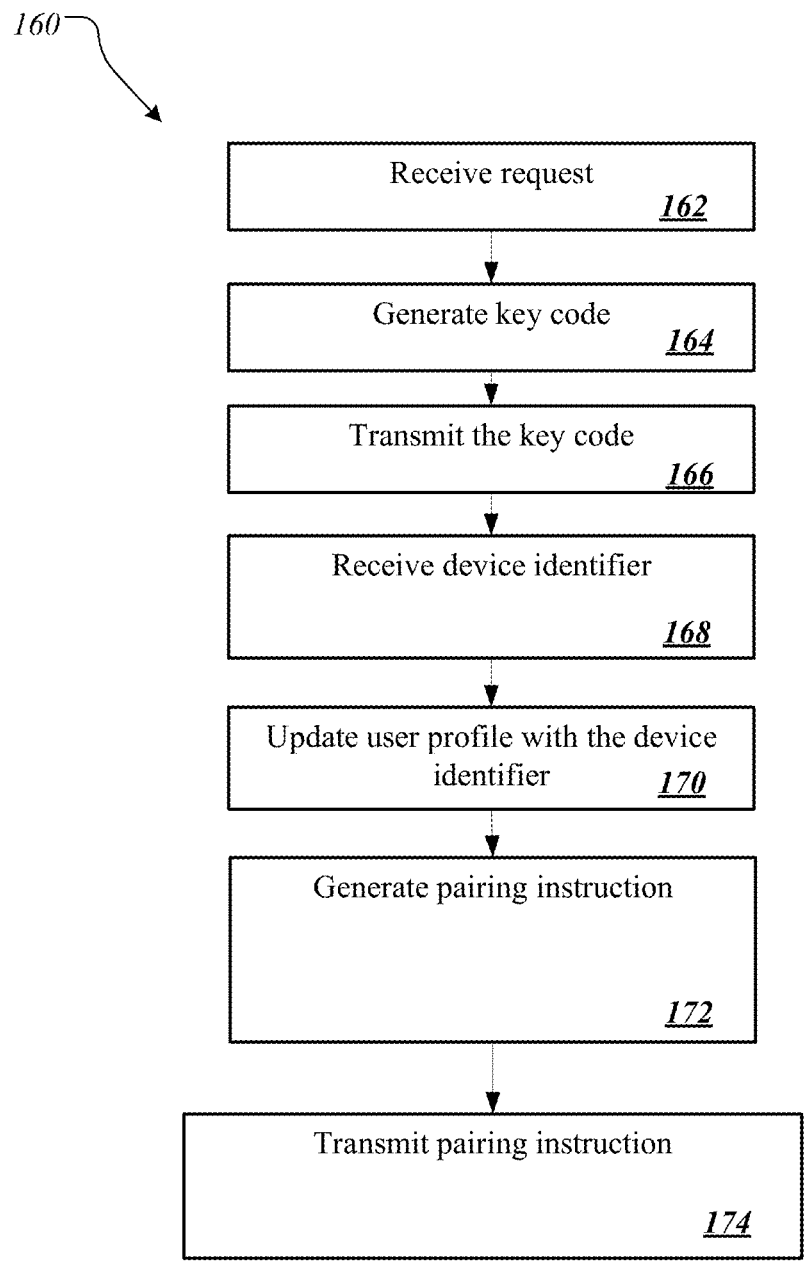

Referring to FIG. 4, business processing server 104 implements process 160 in authenticating a mobile device to act as a secondary factor authentication device. In operation, business processing server 104, receives (162), from a client device, a request to authenticate a mobile device to act as a secondary factor authentication device. In response to the request, business processing server 104 generates (164) a key code for authenticating mobile device 116 as a secondary factor authentication device.

Business processing server 104 transmits (166) the key code to the client device. A user of the client device views the key code and enters the key code into a graphical user interface displayed on a mobile device. The mobile device transmits the key code to the authentication system. The authentication system validates the key code, e.g., using the above described techniques. Following validation of the key code, business processing server 104 receives (168), from the authentication system, the device identifier of the mobile device that is associated with the user. Along with the device identifier, business processing server 104 also receives information indicative of the key code that was transmitted to the authentication system, e.g., to enable business processing server 104 to match the received key code with a key code associated with a user profile.

Business processing server 104 identifies a user profile that includes a key code that matches the received key code. Business processing server 104 updates (170) the identified user profile with the device identifier, e.g., to promote generation of an authentication token (for a user associated with the identifier user profile) that includes the device identifier. The authentication token is user in performing secondary factor authentication with a secondary factor authentication device that is associated with the device identifier.

Business processing server 104 also generates (172) a pair instruction for causing automatic establishment of a connection between the client device and the mobile device. Business processing server 104 transmits (174), to the client device, the pairing instruction.

Figure 5:
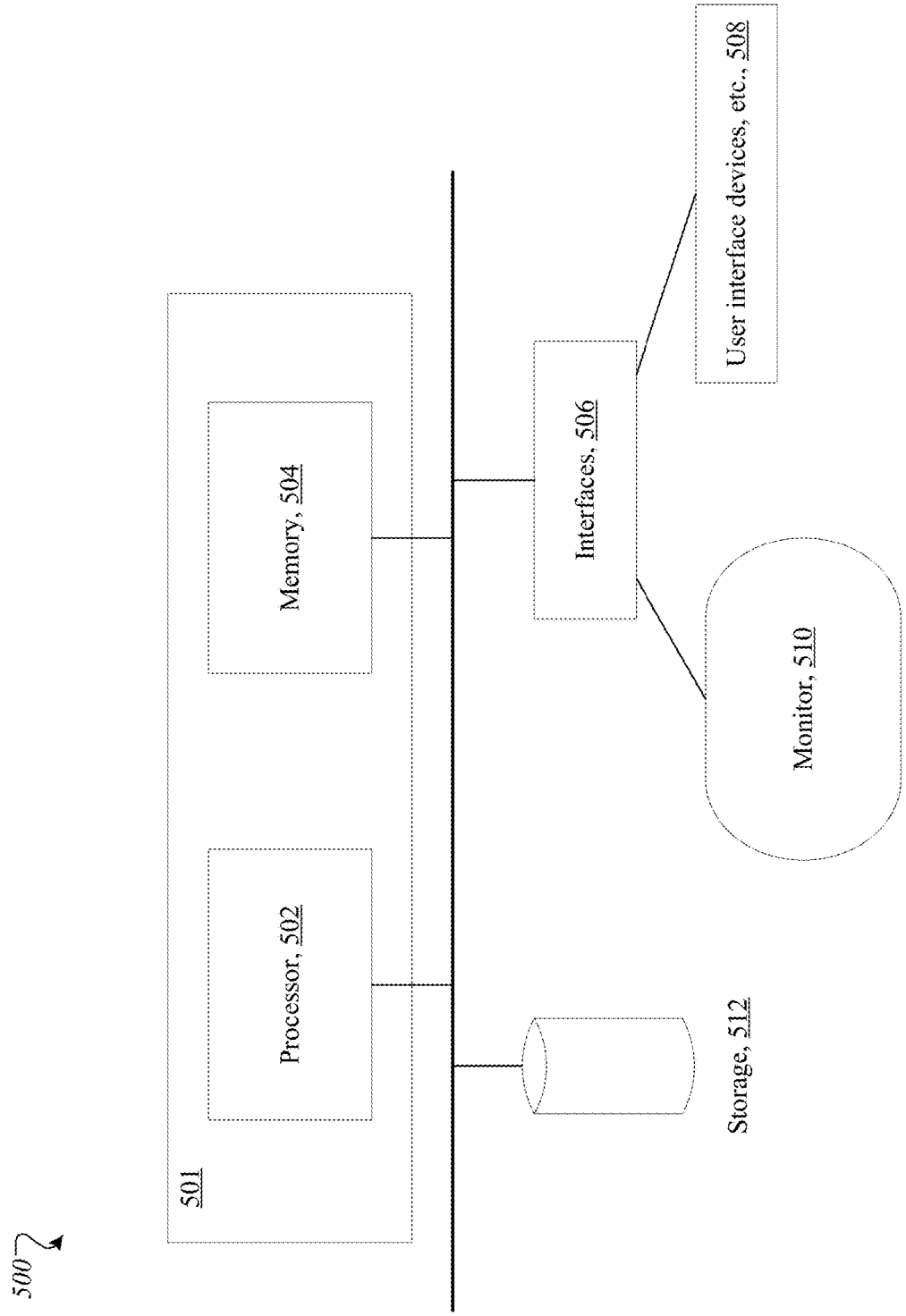
FIG. 5 is a block diagram of typical components for devices in the system of FIG. 1.

FIG. 5 shows details of components of device 501 used in the multifactor authentication system 100. In an example, device 501 includes a client device (e.g., client device 102 or mobile device 116). In another example, device 501 includes a server (e.g., business processing server 104 or authentication server 114). Systems, servers and client devices will typically include a processor 502, memory 504, interfaces 506, storage 512, monitor 510, and user interface devices 508 such as a mouse, etc.

Device 501 can be any sort of computing device capable of taking input from a user and communicating over a network (not shown) with server 104 and/or with other client devices. For example, user devices can be a mobile device, a desktop computer, a laptop, a cell phone, a personal digital assistant ("PDA"), a server, an embedded computing system, a mobile device, a key fob device, and so forth. Client devices can include a monitor that renders visual representations.

Device 501 can also be a server, a distributed computing system, a rack-mounted server, and so forth. Device 501 may be a single server or a group of servers that are at a same location or at different locations.

Device 501 can receive information from a client device, including, e.g., graphical user interfaces. Interfaces 506 can be any type of interface capable of receiving information over a network, such as an Ethernet interface, a wireless networking interface, a fiber-optic networking interface, a modem, and so forth.

Device 501 also includes a processor 502 and memory 504. A bus system (not referenced) can be used to establish and to control data communication.

Processor 502 may include one or more microprocessors. Generally, processor 502 may include any appropriate processor and/or logic that is capable of receiving and storing data, and of communicating over a network (not shown). Memory 504 can include a hard drive and a random access memory storage device, such as a dynamic random access memory, machine-readable media, or other types of non-transitory machine-readable storage devices. Components 500 also include storage device 512, which is configured to store information collected through the brokerage system during a physician's consultation with a patient, as well as an operating system and application software.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer-implemented method of enrolling a mobile device for secondary multifactor authentication, the method comprising:
   receiving from a primary factor authentication device by one or more computer systems, a request to enroll a mobile device as a secondary factor authentication device;
   receiving from the mobile device by the one or more computers, a unique device identifier,
      wherein receiving the unique device identifier triggers generating by the one or more computers, a pairing instruction for the primary factor authentication device to cause the primary factor authentication device to automatically establish a direct connection to the mobile device, which pairing instruction includes information that causes the primary factor authentication device to execute a pairing operation with the mobile device;
   transmitting by the one or more computers, the pairing instruction to the primary factor authentication device; and
   enrolling by the one or more computer systems the mobile device as a secondary factor authentication device for the primary factor authentication device.

2. The method of claim 1 further comprising:
   generating, by the one or more computer systems, a key code for enrolling the mobile device as the secondary factor authentication device; and
   transmitting the key code to the primary factor authentication device.

3. The method of claim 2 wherein the primary factor authentication device is configured to re-transmit the key code to the mobile device.

4. The method of claim 1 further comprising:
   receiving by the one or more computers from an authentication system that received the key code from the mobile device, a message specifying validation of the key code.

5. The method of claim 1 wherein the mobile device has a unique device identifier, the one or more computers accesses a user profile that is associated with login credentials of a user and the mobile device, and enrolling further comprises:
   receiving, by the one or more computer systems from an authentication system, the unique device identifier of the mobile device; and
   adding by the one or more computer systems, the unique device identifier to the user profile of the user associated with the primary factor authentication device that sent the request.

6. The computer-implemented method of claim 1, further comprising:
   sending by the one or more computers to the mobile device an authentication application to enable the mobile device to forward to the one or more computers secondary factor authentication information.

7. The computer-implemented method of claim 6, wherein the one or more computers receives from the authentication application executed on the mobile device, the secondary factor authentication information including the key code entered into a user interface.

8. A computer program product tangibly stored on a computer readable storage device, the computer program product comprising instructions for causing a computer system to:
  receive from a primary factor authentication device, a request to enroll a mobile device as a secondary factor authentication device;
  receive from the mobile device a unique device identifier, wherein receiving the unique device identifier triggers generating a pairing instruction for the primary factor authentication device to cause the primary factor authentication device to automatically establish a direct connection to the mobile device, which pairing instruction includes information that causes the primary factor authentication device to execute a pairing operation with the mobile device;
  transmit the pairing instruction to the primary factor authentication device; and
  enroll the mobile device as a secondary factor authentication device for the primary factor authentication device.

9. An apparatus comprising:
  a processor;
  memory coupled to the processor; and
  a storage medium storing a computer program for causing the processor to:
    receive from a primary factor authentication device, a request to enroll a mobile device as a secondary factor authentication device;
    receive from the mobile device a unique device identifier, wherein receiving the unique device identifier triggers generating a pairing instruction for the primary factor authentication device to cause the primary factor authentication device to automatically establish a direct connection to the mobile device, which pairing instruction includes information that causes the primary factor authentication device to execute a pairing operation with the mobile device;
    transmit the pairing instruction to the primary factor authentication device; and
    enroll the mobile device as a secondary factor authentication device for the primary factor authentication device.

10. The computer program product of claim 8, further comprising instructions to cause the processor to:
  generating, by the one or more computer systems, a key code for enrolling the mobile device as the secondary factor authentication device; and
  transmitting the key code to the primary factor authentication device.

11. The computer program product of claim 8, further comprising instructions to cause the processor to:
  receive from an authentication system that received the key code from the mobile device, a message specifying validation of the key code.

12. The computer program product of claim 8, wherein the mobile device has a unique device identifier the computer program accesses a user profile that is associated with login credentials of a user and the mobile device, and instructions to enroll further comprise instructions to cause the processor to:
  receive from an authentication system, the unique device identifier of the mobile device; and
  add the device identifier to the user profile of the user associated with the primary factor authentication device that sent the request.

13. The apparatus of claim 9, wherein the computer program product further comprises instructions to cause the processor to:
  generate a key code for enrolling the mobile device as the secondary factor authentication device; and
  transmit the key code to the primary factor authentication device.

14. The apparatus of claim 9, wherein the computer program product further comprises instructions to cause the processor to:
  receive from an authentication system that received the key code from the mobile device, a message specifying validation of the key code.

15. The apparatus of claim 9, wherein the mobile device has a unique device identifier the computer program accesses a user profile that is associated with login credentials of a user and the mobile device, and instructions to enroll further comprise instructions to cause the processor to:
  receive from an authentication system, the unique device identifier of the mobile device; and
  add the device identifier to the user profile of the user associated with the primary factor authentication device that sent the request.

16. A system comprises:
  a business processor computer system, comprising one or more processors and memory coupled to the processors; and
  a storage medium storing a computer program product for causing the business processor computer system to:
    receive from a primary factor authentication device, a request to enroll a mobile device as a secondary factor authentication device;
    receive from the mobile device a unique device identifier, wherein receiving the unique device identifier triggers generating a pairing instruction for the primary factor authentication device to cause the primary factor authentication device to automatically establish a direct connection to the mobile device, which pairing instruction includes information that causes the primary factor authentication device to execute a pairing operation with the mobile device;
    transmit the pairing instruction to the primary factor authentication device; and
    enroll the mobile device as a secondary factor authentication device for the primary factor authentication device; and
  an authentication computer system, comprising one or more processors and memory coupled to the processors; and
  a storage medium storing a computer program product for causing the an authentication computer system to:
    receive a key code from the mobile device;
    validate that key code is a valid key code generated by the business processor computer system, by comparing the received key code to other key codes previously received from the business processor computer system; and
    store the device ID for mobile device and key in a data repository; and
    generate an association between the device ID and the key.

17. The method of claim 1 further comprising:
  receiving from the mobile device by the one or more computers, secondary factor authentication information including an encryption key generated by the mobile device;

storing by the one or more computers, the encryption key and the unique device identifier in a data repository; and generating by the one or more computers, an association between the encryption key and the unique device identifier.

18. The computer program product of claim 8 further comprising instructions for causing a computer system to:

receive from the mobile device, secondary factor authentication information including an encryption key generated by the mobile device;

store the encryption key and the unique device identifier in a data repository; and generate an association between the encryption key and the unique device identifier.

19. The apparatus of claim 9 wherein the computer program is further for causing the processor to:

receive from the mobile device, secondary factor authentication information including an encryption key generated by the mobile device;

store the encryption key and the unique device identifier in a data repository; and generate an association between the encryption key and the unique device identifier.

20. The system of claim 16 wherein the computer program product is further for causing the business processor computer system to:

receive from the mobile device, secondary factor authentication information including an encryption key generated by the mobile device;

store the encryption key and the unique device identifier in a data repository; and generate an association between the encryption key and the unique device identifier.

* * * * *